United States Patent
Bechter (10) Patent No.: US 10,564,255 B2
(45) Date of Patent: Feb. 18, 2020

(54) METHOD AND DEVICE FOR OPERATING A RADAR SYSTEM OF A MOTOR VEHICLE

(71) Applicant: Robert Bosch GmbH, Stuttgart (DE)

(72) Inventor: Jonathan Bechter, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 15/535,140

(22) PCT Filed: Oct. 27, 2015

(86) PCT No.: PCT/EP2015/074791
§ 371 (c)(1),
(2) Date: Jun. 12, 2017

(87) PCT Pub. No.: WO2016/096207
PCT Pub. Date: Jun. 23, 2016

(65) Prior Publication Data
US 2017/0343646 A1 Nov. 30, 2017

(30) Foreign Application Priority Data

Dec. 16, 2014 (DE) .................. 10 2014 226 073

(51) Int. Cl.
*G01S 7/02* (2006.01)
*G01S 7/35* (2006.01)
*G01S 13/93* (2006.01)
*G01S 13/931* (2020.01)

(52) U.S. Cl.
CPC .............. *G01S 7/023* (2013.01); *G01S 7/354* (2013.01); *G01S 13/931* (2013.01); *G01S 2007/358* (2013.01)

(58) Field of Classification Search
CPC ........ G01S 7/023; G01S 7/354; G01S 13/931; G01S 2007/358
USPC ............................................. 342/13
See application file for complete search history.

(56) References Cited

U.S. PATENT DOCUMENTS

| 8,368,582 B2 * | 2/2013 | Ishizawa ................. G01S 7/023 342/26 R |
| 2006/0125682 A1 | 6/2006 | Kelly et al. |
| 2010/0019950 A1 | 1/2010 | Yamano et al. |

(Continued)

FOREIGN PATENT DOCUMENTS

| EP | 2290396 A2 | 3/2011 |
| JP | 2006300550 A | 11/2006 |

(Continued)

OTHER PUBLICATIONS

Translation of PCT Preliminary Report on Patentability, PCT/EP2015/074791, dated Jun. 20, 2017 (Year: 2017).*

(Continued)

*Primary Examiner* — Frank J McGue
(74) *Attorney, Agent, or Firm* — Norton Rose Fulbright US LLP; Gerard Messina (57) ABSTRACT

A method for operating a radar system of a motor vehicle includes receiving a reception signal, deriving the reception signal from time, ascertaining parameters of an interference signal from the derived reception signal, reconstructing the interference signal from the parameters, and eliminating the interference signal from the reception signal.

13 Claims, 7 Drawing Sheets

(56) References Cited

U.S. PATENT DOCUMENTS

2010/0283664 A1    11/2010  Weber
2011/0050486 A1*  3/2011  Ishizawa ................ G01S 7/023
                                                          342/26 R

FOREIGN PATENT DOCUMENTS

JP         2008180703 A    8/2008
JP         2009139321 A    6/2009

OTHER PUBLICATIONS

Tranlation of Description of EP2290396, Mar. 2, 2011 (Year: 2011).*
International Search Report dated Jan. 21, 2016 of the corresponding International Application PCT/EP2015/074791 filed Oct. 27, 2015.

* cited by examiner

METHOD AND DEVICE FOR OPERATING A RADAR SYSTEM OF A MOTOR VEHICLE

CROSS-REFERENCE TO RELATED APPLICATIONS

The present application is the national stage of International Pat. App. No. PCT/EP2015/074791 filed Oct. 27, 2015, and claims priority under 35 U.S.C. § 119 to DE 10 2014 226 073.6, filed in the Federal Republic of Germany on Dec. 16, 2014, the content of each of which is incorporated herein by reference in its entirety.

FIELD OF THE INVENTION

The present invention relates to a method and device for operating a radar system of a motor vehicle.

BACKGROUND

Future vehicle generations will be equipped increasingly with radar sensors with regard to traffic safety and autonomous driving. With high traffic density and many installed radar systems, it is to be assumed that, in addition to the signals a radar system itself transmits, signals of various other radar systems will also be received. If the systems transmit in overlapping frequency ranges, an external signal may be reflected as disruption power in the target response of the host signal. The disruption of one radar system by another radar system is referred to as interference.

US 2006/0125682 A1 describes a method, which is said to detect the start and end of an interference via jumps in the time signal or in its derivation. A countermeasure in the form of so-called "zero-padding" and subsequent reconstruction of the useful signal by a curve fitting or by using an average value is carried out.

SUMMARY

A disadvantage of these measures, however, is that a part of the useful signal may be lost.

An object of the present invention is to provide an improved method for operating a radar system of a motor vehicle.

According to a first aspect, a method for operating a radar system of a motor vehicle includes the steps of: receiving a reception signal; deriving the reception signal from time; ascertaining parameters of an interference signal from the derived reception signal; reconstructing the interference signal from the parameters; and eliminating the interference signal from the reception signal.

According to a second aspect, a device for operating a radar system of a motor vehicle includes: a differentiation device for deriving the reception signal from time; an ascertainment device for ascertaining parameters of the derived reception signal, the parameters representing a measure for a chronological derivation of a phase response of the interference signal; a reconstruction device for reconstructing the interference signal from the parameters; and an elimination device for eliminating the interference signal from the reception signal.

One advantageous refinement of the method provides that the parameters of the interference signal are ascertained from extreme values of the derived reception signal, a straight line being ascertained from the extreme values, which is a measure for a chronological derivation of a phase response of the interference signal. In this way, a representative image for the interference signal contained in the reception signal may be formed.

Another advantageous refinement of the method provides that an amplitude of the interference signal is ascertained from average values of the extreme values of the reception signal. In this way, an amplitude of the interference signal can be ascertained by an estimation process.

Another advantageous refinement of the method provides that a slope and an axis intercept of the straight line are ascertained. In this way, the chronological derivation of the phase response can be ascertained, with the aid of which the interference signal is reconstructed, in order to ascertain therefrom a useful signal from which the disruptive interference signal has been purged.

Another advantageous refinement of the method provides that the radar system includes an IQ mixer, a differentiation device being used for deriving the reception signal for each path of the IQ mixer, the parameters of the straight line of the chronological derivation of the phase response of the interference signal being ascertained with the aid of an ascertainment device, the portions of the reception signal derived for each path of the IQ mixer being weighted with the chronological derivation of the phase response, and the useful portions of the reception signal being ascertained for each path of the IQ mixer. In this way, it is advantageously unnecessary to determine any zero phase angle of the phase response.

Another advantageous refinement of the method provides that the ascertainment device is provided for only one signal path of the IQ mixer. In this way, it is advantageously possible to keep the hardware outlay of the radar system to a minimum.

Another advantageous refinement provides that an ascertainment of a zero phase angle of the phase response of the interference signals is carried out. In this way, it is also possible to carry out a reconstruction of the useful signal even in the absence of an IQ mixer.

The present invention, including additional features and advantages, is described in detail below with reference to multiple figures. In this case, all features manifested in the description and in the figures form the subject matter of the present invention, regardless of their back-reference in the patent claims. The figures serve primarily to explain the principles essential to the present invention. Identical or functionally identical elements are provided with identical reference numerals.

DETAILED DESCRIPTION

Figure 1:
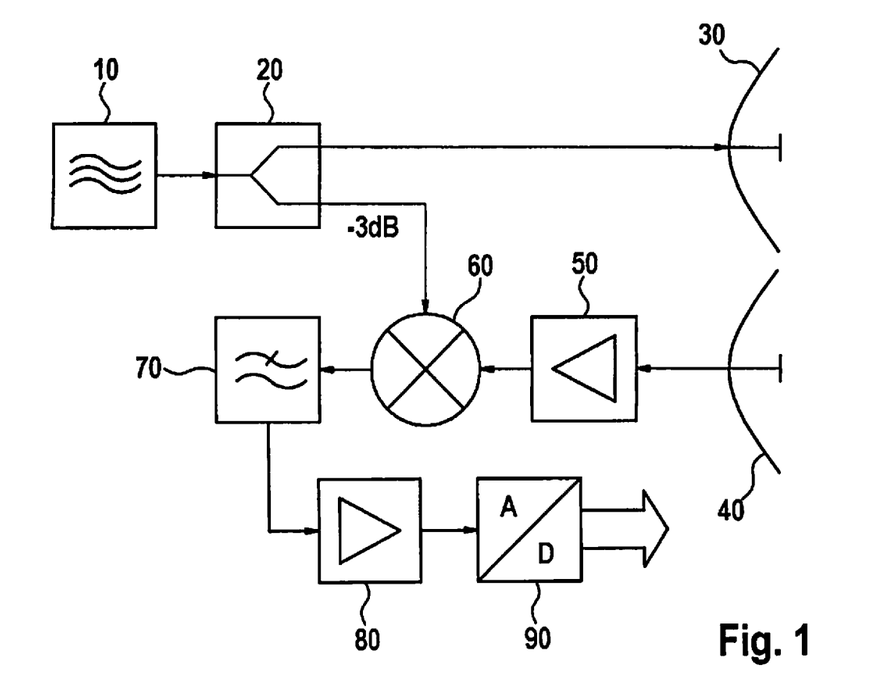
FIG. 1 shows a block diagram of a conventional radar system.

FIG. 1 shows a block diagram of a conventional frequency modulated continuous wave radar system (FMCW). In this system, a generator 10 is provided, which feeds a transmission signal to a power splitter 20. Half of the signal is fed from power splitter 20 to a transmission antenna 30 and half is fed to a mixer 60. A reception signal reflected by targets is received by a receiving antenna 40 and is fed to a HF preamplifier 50 and subsequently to a mixer 60. The transmission signal and the reception signal are multiplied by each other with the aid of mixer 60, the result being fed to a filter 70, for example, in the form of a low-pass, to be filtered. From there, the filtered signal passes to a baseband amplifier 80, to an analog-digital converter 90 and subsequently via an interface to a computer (not depicted). With such a FMCW radar system, it is possible in the automotive field, for example, to determine distance, direction and velocity of targets.

The mutual disruption of linear frequency modulated continuous wave radars (LFMCW radars) is considered in the following.

Figure 2:
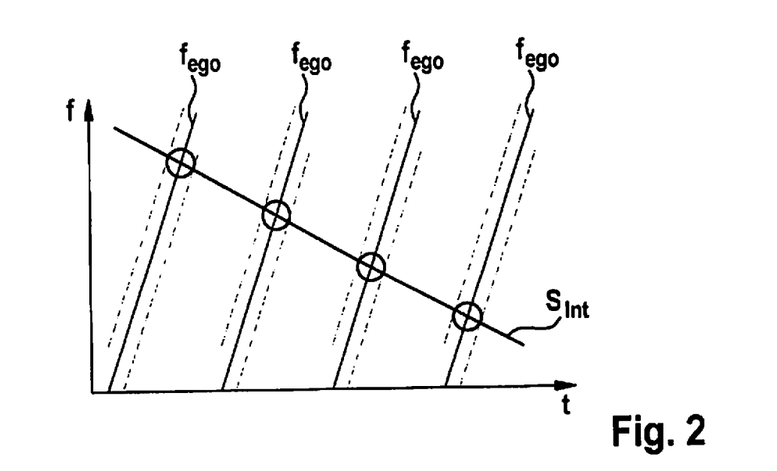
FIG. 2 shows a depiction of a transmission signal of the radar system including a disruptive signal of another radar system.

FIG. 2 shows multiple ramps $f_{ego}$ of the transmission signal in a time-frequency diagram, for example, as a signal having a chirp sequence modulation, which interferes in a defined range with a noise signal or interference signal $s_{int}$, which is emitted, for example, by a radar system of another motor vehicle. A range delimited by dashes to the left and right of the transmission ramps $f_{ego}$ represents a reception bandwidth of the radar system, a signal reflected from a target (not depicted) including a signal curve situated in parallel to transmission ramp $f_{ego}$ within the reception bandwidth, the reflected signal being time delayed relative to transmission ramp $f_{ego}$.

Dashed lines to the right and left of each of transmission ramps $f_{ego}$ of the transmission signal illustrate an effect of filter 70 of the radar system of FIG. 1, so that an interference effect of the transmission signal with interference signal $s_{int}$ only occurs in the areas illustrated by circles. The interference in the reception signal of the radar system has a symmetry toward the middle of the interference interval, if the frequency ramps of two RMCW radars intersect. Thus, a precondition of an interference effect is an at least differing slope of the modulation of the transmitting signal and of the interfering signal.

This can be reflected in increased noise in the frequency spectrum or in a reduced sensibility in the detection of targets. For the cited symmetry, the frequency ramp of the disruptive radar signal must lie completely within the reception bandwidth, which is indicated in FIG. 2 by two dashed lines, which is unlikely if the interference occurs at the beginning or toward the end of the useful signal. Then, the interference is not so strongly disruptive regardless, due to the windowing (for example, Henning window) of the measured data, since the values at the edge of the ramp are only weakly weighted.

The cause of the symmetry is the phase response $\varphi_{int}(t)$ of interference signal $s_{int}$ over the entire duration of interference $T_{int}$, which can be represented mathematically as follows:

$$\varphi_{int}(t) - 2\pi \cdot \int_{T_{int}} f_{int}(t)dt = 0 \quad (1)$$

where $\varphi_{int}(t)$ is phase response of the interference signal and $f_{int}$ is frequency of interference signal $s_{int}$, i.e., viewed over the entire interference time period $T_{int}$, the phase change adds up to zero. Frequency response $f_{int}(t)$ of down-mixed interference signal or noise signal $f_{int}$ results from the difference between interference signal $s_{int}$ and the transmission signal within the reception bandwidth illustrated with circles in FIG. 2.

An axial symmetry exists with respect to the position $f_{int}(T_{int}/2)=0$ (point of intersection of interference signal and transmission signal). If the signal is differentiated, a signal symmetrical to its origin forms, the middle of interference duration $T_{int}$ forming the origin. This is equivalent to an axially symmetrical cosine derived resulting in a negative sine symmetrical to its origin.

Figure 3:
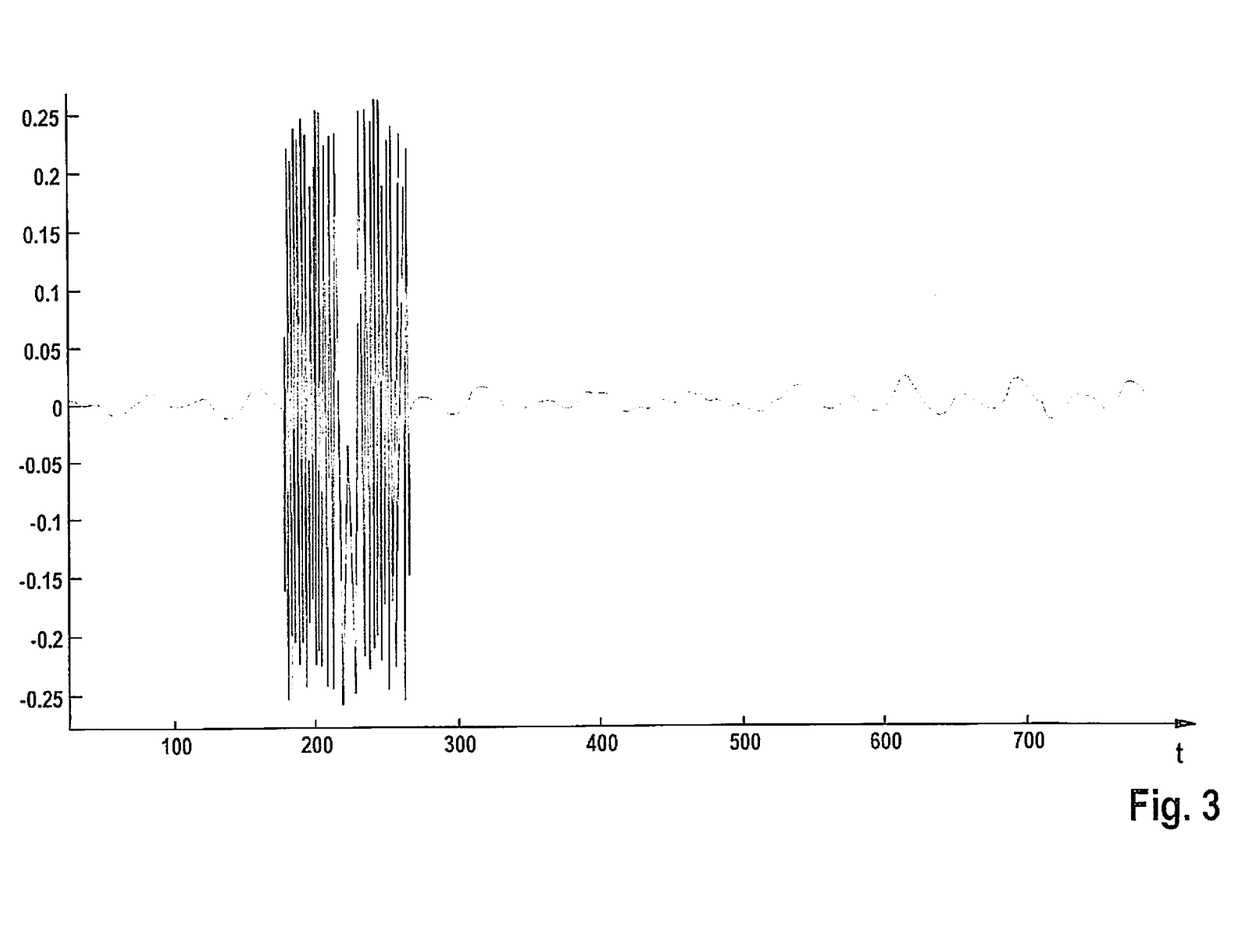
FIG. 3 shows a depiction of interference in a reception signal of the radar system.

FIG. 3 shows effects of the interference on the time signal of a frequency ramp $f_{ego}$ of the transmission signal of the host radar. It is apparent that a minimal signal in terms of amplitude occurs on a large part of the time axis. In a range of the time axis between approximately 180 and approximately 270 (qualitative time specifications) on the other hand, an increased amplitude curve is apparent, which is caused by an interference effect of the transmission signal on a transmission signal of another radar system.

It is now provided to differentiate the received time signal and to obtain information about the specific nature (frequency response) of the down-mixed interference signal from this chronological derivation. This information is utilized in order to thereby deduce the interference portion in the received time signal and to remove it from the time signal or to reduce it. The result is, therefore, a system for repairing the incident time signal or reception signal $s_{in}(t)$.

The reception signal $s_{in}(t)$ of the radar system may generally be represented mathematically as follows:

$$S_{in}(t)^n = \Sigma S_N + \Sigma S_{Int} \quad (2)$$

where $s_{in}(t)$ is the entire reception signal and $s_N$ is the useful signal, and thus forms a superposition of useful signals $s_{use}$ and interference signals $s_{int}$.

A limitation to a single interference signal $s_{int}$ is considered below, whereby the approach can also be applied to systems having multiple interference signals. Interference signals $s_{int}$ can be represented in the time range mathematically as follows:

$$s_{int} = A_{int} \cdot \cos \varphi_{int}(t) \quad (3)$$

where $s_{int}$ is the interference signal, $A_{int}$ is amplitude of the interference signal, and $\varphi_{int}(T)$ ... is phase response of the interference signal.

Phase response $\varphi_{int}(t)$ of interference signal $s_{int}$ results from the difference between the frequency ramps of reception signal $s_{in}$ and interference signal $s_{int}$ according to the following mathematical relationship:

$$\varphi_{int}(t) = \quad (4)$$
$$2\pi \int f(t)dt = 2\pi \int \left[ f_{c,int} - f_{c,ego} + \left( \frac{B_{int}}{T_{c,int}} - \frac{B}{T_c} \right) \cdot t + \frac{B_{int}}{T_{c,int}} \cdot \Delta t \right] dt$$

where the parameters are defined as follows:

$T_{int}$ chronological duration of the interference signal within the reception bandwidth;

B frequency swing of the transmitted frequency ramp;

$B_{int}$ frequency swing of the frequency ramp of the interference signal;

$T_c$ chronological duration of the transmitted frequency ramp;

$T_{c,int}$ chronological duration of the interference signal;

$f_{c,int}$ carrier frequency of the interference signal;

$f_{c,ego}$ carrier frequency of the transmission signal;

$\Delta t$ chronological shift of interference signal and transmission signal; and $\varphi_i$ zero phase angle of a target response.

Useful signals $s_N$ can be described as oscillations of constant frequency mathematically as follows:

$$s_{n,i} = A_{n,i} \times \cos(2\pi f_{beat,I} \times t + \varphi_i) \tag{5}$$

where $f_{beat,I}$ is constant frequency of the nth target response after downmixing.

Figure 4A:
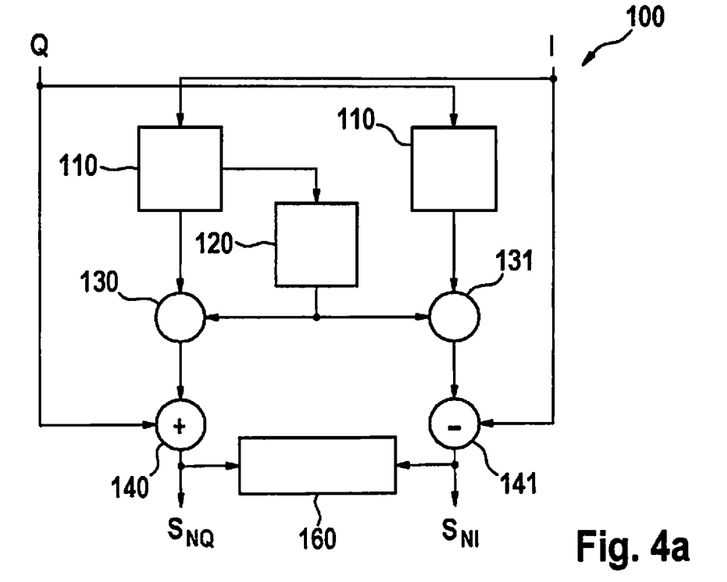
FIG. 4a shows a block diagram of a device according to a first example embodiment of the present invention.

FIG. 4a illustrates in a functional manner a first specific embodiment of a device 100 for operating a radar system of a motor vehicle. It is apparent that a Q-portion and an I-portion of reception signal $s_{in}$ for an IQ mixer are fed to device 100. A chronological derivation of each of the I-portion and of the Q-portion of reception signal $s_{in}$ is undertaken with the aid of a differentiation device 110.

If the chronological derivation of reception signal $s_{in}$ is formed, information can be obtained about the disruptive interference according to the following mathematical relationships:

$$\frac{d}{dt} S_{in}(t) = \frac{d}{dt} S_{int}(t) + \frac{d}{dt} \sum S_{useful,i}(t) = \tag{6}$$
$$-A_{int}\varphi_{int}(t) \cdot \sin(\varphi_{int}(t)) + \sum A_i \cdot (2\pi f_i) \sin(2\pi f_i t + \varphi_i)$$

$$\varphi_{int}(t) = \frac{d}{dt}\varphi_{int}(t) = 2\pi \left( f_{c,int} - f_{c,ego} + \left( \frac{B_{int}}{T_{c,int}} - \frac{B}{T_c} \right) \cdot t + \frac{B_{int}}{T_{c,int}} \cdot \Delta t \right) \tag{7}$$

where $\varphi_{int}(t)$ is chronological derivation of the phase response of the interference signal and has the form of a straight line, the parameters of which can be determined from derived reception signal $s_{in}$. For this purpose, peak values or extreme values above and below a particular threshold value can be listed, since interference signal $s_{int}$ and its derivation have a higher amplitude than the useful signals. The average value thereof before the derivation supplies amplitude $A_{int}$ of interference signal $s_{int}$. The extreme values in derived input signal $s_{in}$ can be utilized to determine the parameters of the straight line and thus to determine $\varphi_{int}(t)$. In so doing, a straight line is formed by the extreme values for which there are two possible answers, which differ by factor $-1$ (different slopes). The "false" straight line, i.e., the straight line having the "false" slope results in an increase in the disruption power and can therefore be ignored as implausible. It can be detected, for example, by comparing the extreme values of reconstructed interference signal $s_{int}$ with the measured extreme values in reception signal $s_{in}$.

The ascertainment in this case takes place with the aid of an ascertainment device 120. The ascertainment of the parameters must be carried out in each case for only one signal component I, Q, the results of the parameter ascertainment being multiplied in a step 130 by the derived signal component with the aid of a multiplier device 130.

The weighted result is totaled with the Q component with the aid of an elimination device 140 (summing unit), and from this useful signal $s_N$ is obtained. It is then also checked with the aid of a control device 160 whether the interference portion in reception signal $s_{in}$ is increased or lowered. In the event the interference portion is increased, the false straight line was used, so that the other straight line had to be used to form useful signal $s_N$. The result, therefore, is a repaired input signal, which has been purged of interference portions. The approach is the same for the Q-path, a subtractor 141 being used as elimination device 141.

Figure 5:
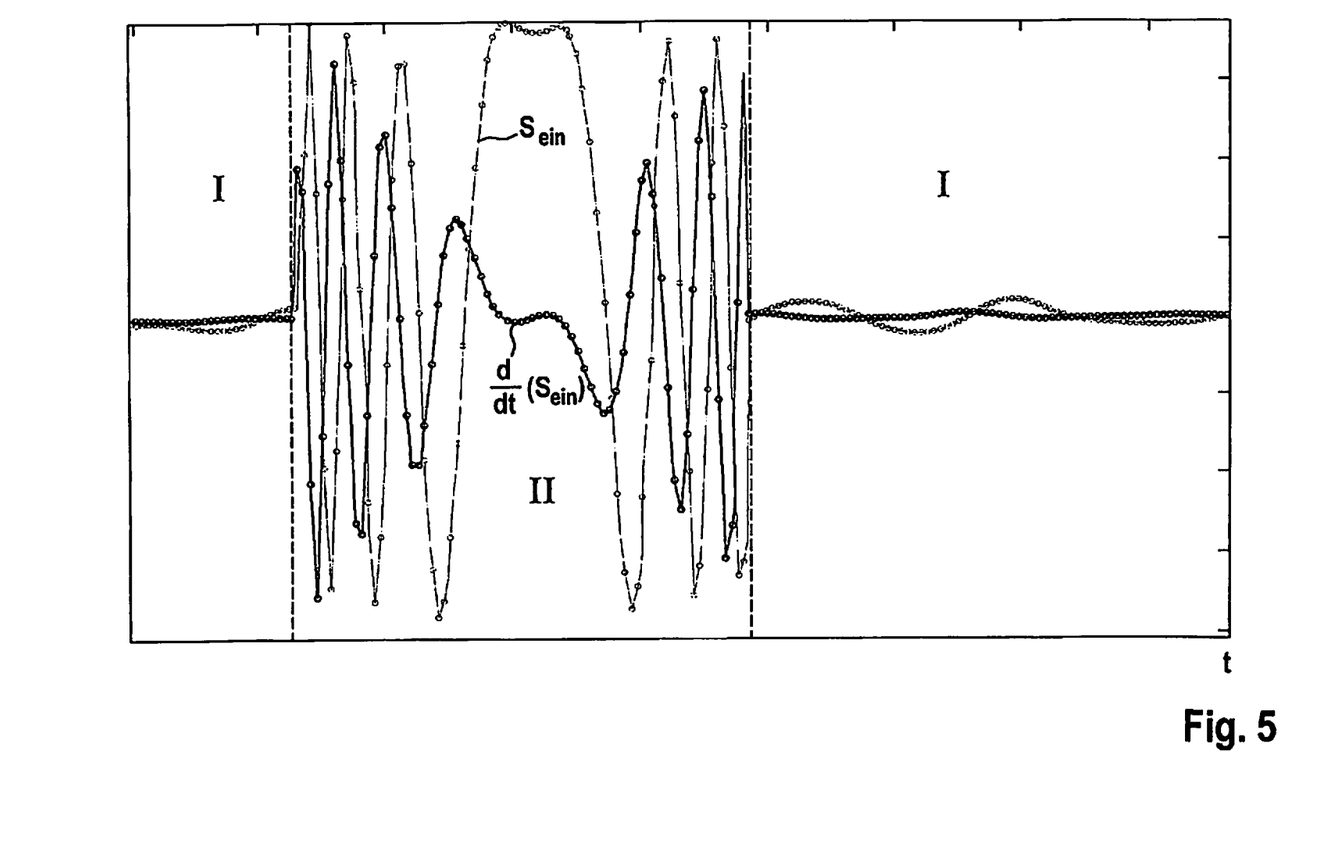
FIG. 5 shows a basic depiction of a reception signal and of its chronological derivation, according to an example embodiment of the present invention.

As depicted in FIG. 5, the chronological derivation of useful signals $s_N$ is very small in undisrupted areas I of reception signal $s_{in}$ as compared to the derivation of a reception signal $s_{in}$ in area II subject to interference. Thus, interference occurs exclusively in area II. The differentiated cosine signal is then weighted in such a way that the interference portion exhibits the same amplitude curve as in the sinus signal. The weighting must therefore be $(\varphi_{int}(t))^{-1}$, which has a curve similar to $f(x)=x^{-1}$. Since $(\varphi_{int}(t))^{-1}$ tends toward the infinite for the middle of the interference duration, an upper limit for this should be set in the system. Finally, the weighted signal is subtracted from the sinus signal.

The derivation of the I-component of reception signal $s_{in}$ can be represented mathematically as following:

$$\frac{d}{dt}\sum S_{useful} + \frac{d}{dt} S_{int} \approx -A_{int}\varphi_{int}(t) \cdot \sin(\varphi_{int}(t)) \tag{8}$$

Applicable for the Q-component of reception signal $s_{in}$ is:

$$\Sigma A_i \cdot \sin(f_i t + \varphi_i) + A_{int} \cdot \sin(\varphi_{int}(t)) \tag{9}$$

Sum and weighting with $(\varphi_{int}(t))^{-1}$ result in:

$$\Sigma A_i \cdot \sin(f_i t + \varphi_i) + A_{int} \cdot \sin(\varphi_{int}(t)) - (\varphi_{int}(t))^{-1} \cdot A_{int} \varphi_{int}(t)$$
$$\cdot \sin(\varphi_{int}(t)) = s_N \tag{10}$$

In this way, reception signal $s_{in}$ was purged of the interference portion or interference signal $s_{int}$, so that a disruption-free useful signal $s_N$ is provided. To a certain degree, there is also a loss of useful signal $s_N$, since the weighted I-component still contains parts of useful signal $s_N$.

A high degree of accuracy of the parameter estimation is advantageously not absolutely necessary in the case of device 100 of FIG. 4a in order to superpose the terms in such a way that the amplitudes in the interference portions are cancelled out. Moreover, with this variant it is advantageously not necessary to determine a zero phase angle of the phase response.

Figure 4B:
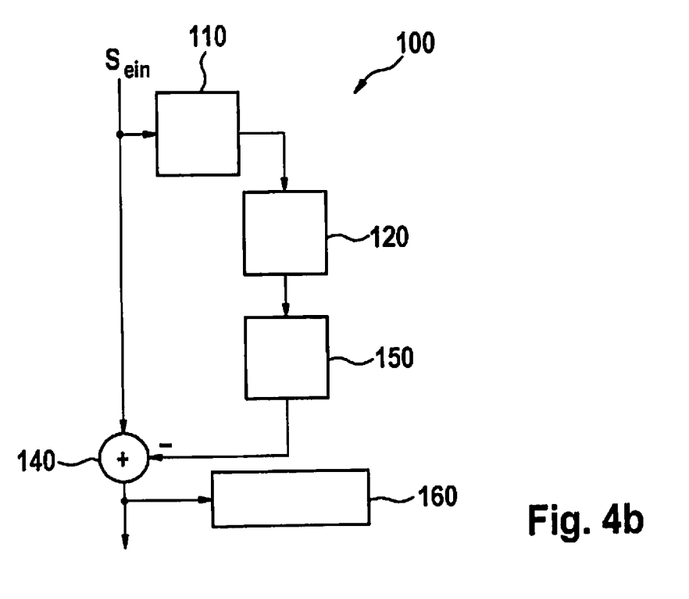
FIG. 4b shows a block diagram of a device according to a second example embodiment of the present invention.

A second specific embodiment of device 100 is schematically depicted in FIG. 4b. In this case, no IQ mixer is used in the radar system, interference signal $s_{int}$ being reproduced from the amplitude and the frequency of reception signal $s_{in}$ and being subtracted from reception signal $s_{in}$. Differentiation device 110 is the same as in the specific embodiment of device 100 of FIG. 4a, as is ascertainment device 120. In addition to the slope and to the axis intercept of the straight line, the zero phase angle of the phase response must also be determined in this case, for example, by ascertaining the phase relation of reception signal $s_{in}$ in the middle of interference duration $T_{int}$ (approximately in the middle of area II of FIG. 5). A chronological duration of the interference is determined either via the outermost collected peak values during the threshold value detection or via the highest occurring frequency due to the limited reception bandwidth. Since the frequency response of filter 70 has an influence on reception signal $s_{in}$, previous knowledge of this can be utilized to improve an accuracy of device 100.

On the basis of measured data depicted in the figures, it can be recognized that intersecting interference ramps in the time range in fact appear as in the simulation of FIG. 3. Previous publications show interferences, in which only a few (approximately 3 to 5) signal values are influenced by the interference. The difference in the method according to the present invention is attributed to the high receiver bandwidth and sampling rate associated with the extreme steepness of the frequency ramps, which are used, in particular, in a chirp sequence modulation. Thus, it can be assumed that the method according to the present invention is particularly well-suited for the chirp sequence modulation.

For measuring cycles with occurring interference, the attempt was made to reconstruct the interference signal by the estimation with the aid of device 100 in FIG. 4b.

Figure 6:
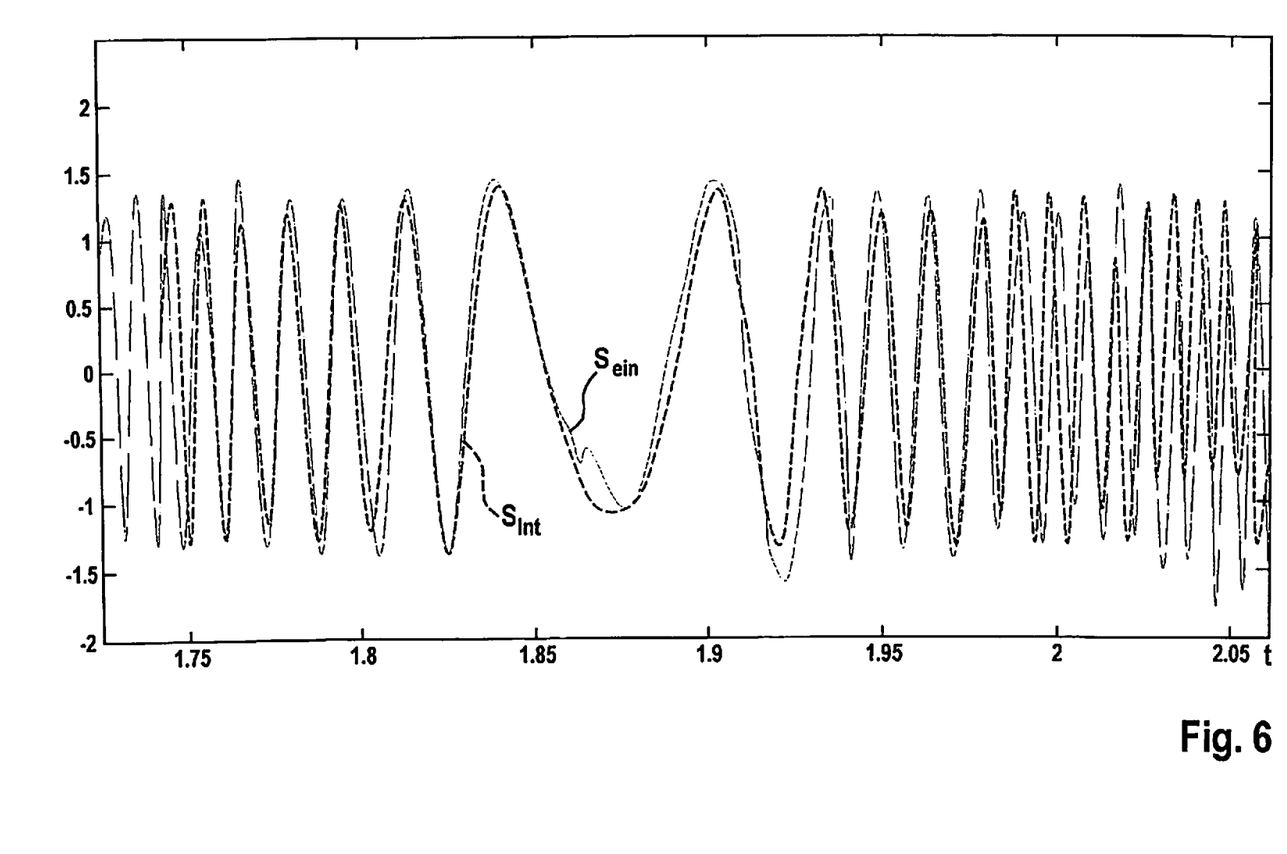
FIG. 6 shows curves of a reception signal over time and of a reconstructed interference signal, according to an example embodiment of the present invention.

In FIG. 6, reception signal $s_{in}$ is represented by a solid line and the interference signal reconstructed from derived reception signal $s_{in}$ is represented by a dashed line.

Figure 7:
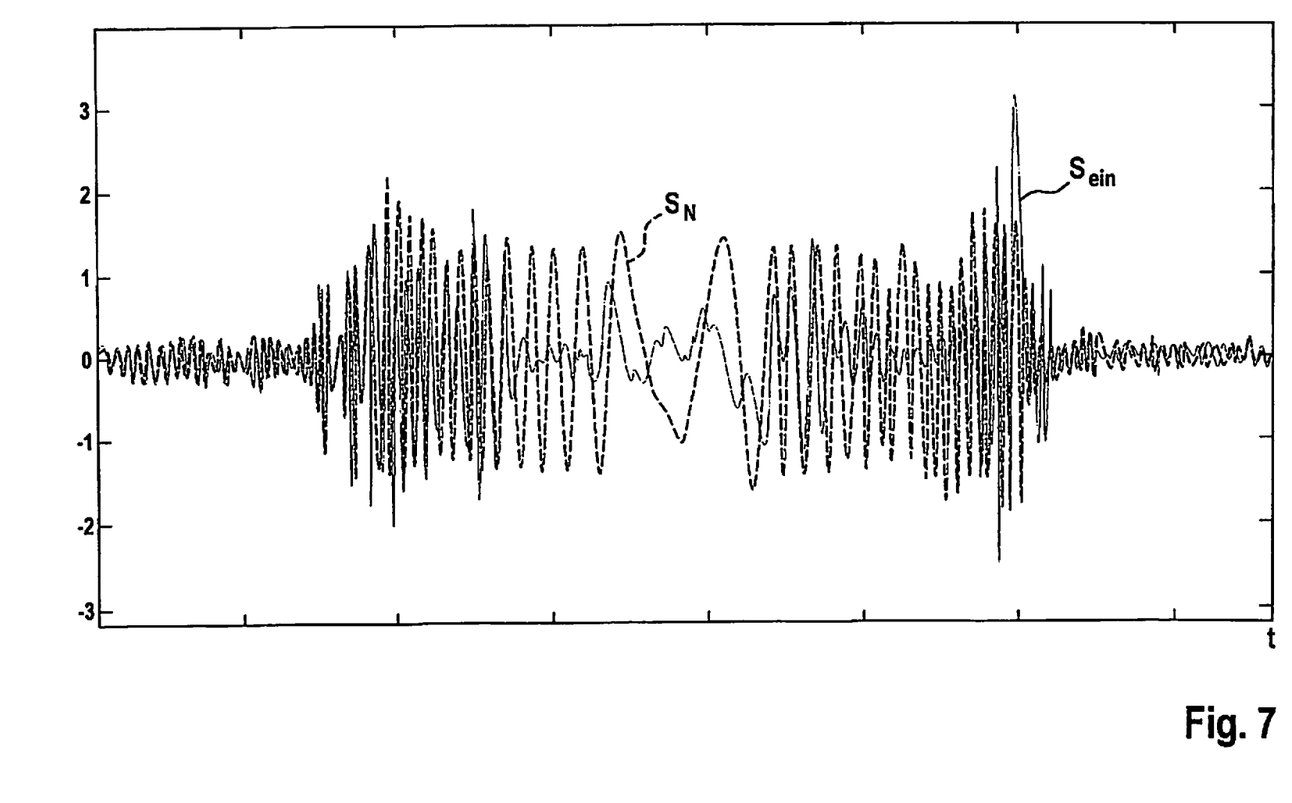
FIG. 7 shows a useful signal purged from an interference signal, according to an example embodiment of the present invention.

In FIG. 7, the measured reception signal $s_{in}$ and the difference between reception signal $s_{in}$ and reconstructed interference signals $s_{int}$ is represented as useful signal $s_N$. The estimation of the parameters should preferably be very precise in order to carry out a meaningful reconstruction.

Figure 8A:
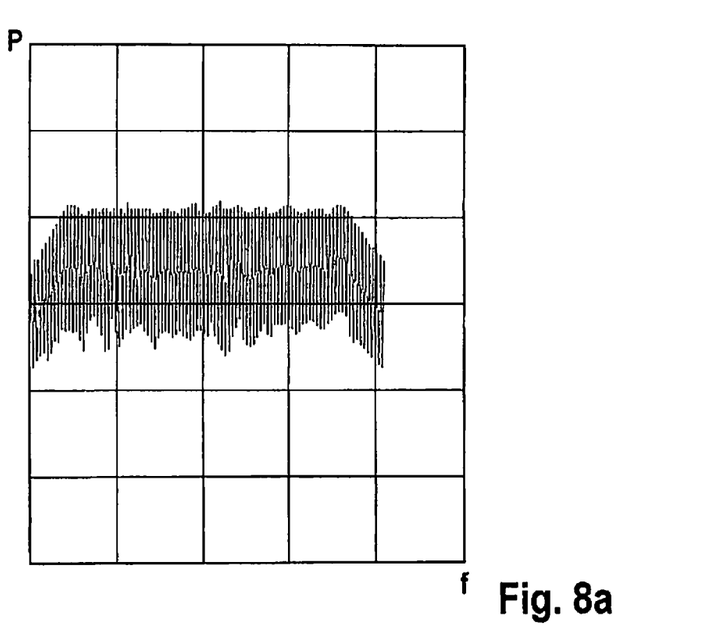
FIG. 8a shows a frequency spectrum before the application of the method.

FIG. 8a shows a frequency spectrum of a radar system before the repair with the aid of the method according to the present invention. A higher noise portion in the spectrum is apparent, no close targets being present.

Figure 8B:
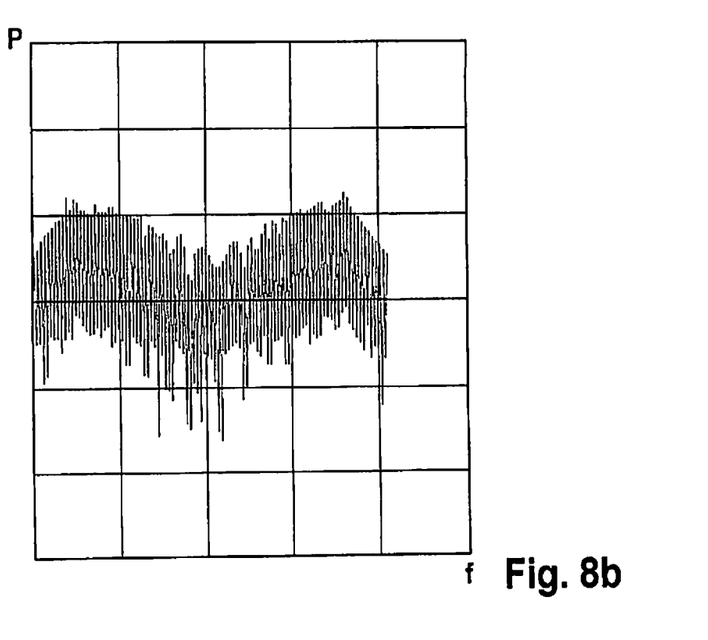
FIG. 8b shows a frequency spectrum after the application of the method, according to an example embodiment of the present invention.

FIG. 8b shows the frequency spectrum after the repair. In the center of the spectrum, it is apparent that the noise has dropped by approximately 10 dB, and individual targets are also recognizable as lines. This is to indicate that the noise portion in the reception signal can be reduced by removing the interference portion.

Device 100 can be advantageously implemented as a software program in the radar system. It is also conceivable, however, to implement device 100 as a software program in one or multiple control units of a motor vehicle.

In summary, example embodiments of the present invention provide a method and a device with which a disruptive interference portion can be eliminated from a reception signal of a radar system. In this way, a detection accuracy can be increased and a signal-to-noise ratio of received signals can be improved.

Although the present invention was described above with reference to specific exemplary embodiments, it is not limited thereto. Those skilled in the art may therefore also implement specific embodiments not described above without departing from the essence of the present invention.

What is claimed is:

1. A method for operating a radar system of a motor vehicle, the method comprising:
    receiving, by a differentiator, a reception signal from a receiver of the radar system;
    determining, by the differentiator, a time derivative of the reception signal;
    ascertaining, by an ascertainer from extreme values of the determined time derivative of the reception signal, a straight line, the straight line representing a measure for a time derivative of a phase response of an interference signal; and
    eliminating, by an eliminator, the interference signal from the reception signal based on the straight line.

2. The method of claim 1, wherein the ascertaining includes ascertaining a slope of the straight line and an axis intercept of the straight line.

3. The method of claim 1, wherein the ascertaining includes ascertaining a zero phase angle of a phase response of the interference signal.

4. The method of claim 1, wherein the ascertaining includes ascertaining from extreme values of the reception signal an amplitude of the interference signal.

5. The method as recited in claim 1, wherein the time derivative of the reception signal is a rate of change of the reception signal over time.

6. The method as recited in claim 5, wherein the extreme values of the determined time derivative of the reception signal are peak values of the determined time derivative of the reception signal.

7. A method for operating a radar system of a motor vehicle, the method comprising:
    receiving a reception signal;
    determining a time derivative of the reception signal;
    ascertaining, from extreme values of the determined time derivative of the reception signal, a straight line, the straight line representing a measure for a time derivative of a phase response of an interference signal; and
    eliminating the interference signal from the reception signal based on the straight line;
    wherein the ascertaining includes ascertaining a slope of the straight line and an axis intercept of the straight line; and
    wherein:
    the radar system includes an IQ mixer, the IQ mixer providing an I-portion of the reception signal along an I path of the IQ mixer and providing a Q-portion of the reception signal along a Q path of the IQ mixer, separate from the Q path;
    the determining of the time derivative of the reception signal is performed using a differentiation device;
    the determining of the time derivative of the reception signal includes determining a time derivative of the provided I-portion of the reception signal and determining a time derivative of the provided Q-portion of the reception signal;
    the straight line is ascertained using an ascertainment device based on the time derivative of the I-portion of the reception signal or the time derivative of the Q-portion of the reception signal;
    the determined time derivative of the I-portion of the reception signal and the determined time derivative of the Q-portion of the reception signal are each weighted with the straight line; and
    useful portions of the reception signal are ascertained based on the weighted time derivative of the I-portion of the reception signal and the weighted time derivative of the Q-portion of the reception signal.

8. The method of claim 7, wherein the ascertainment device ascertains the straight line based on only one of: (i) the determined time derivative of the I-portion of the reception signal, or (ii) the determined time derivative of the Q-portion of the reception signal.

9. A device for operating a radar system of a motor vehicle, the device comprising:
    a differentiation device;
    an ascertainment device; and
    an elimination device;
    wherein:
    the differentiation device is configured to determine a time derivative of a reception signal;

the ascertainment device is configured to ascertain, from extreme values of the determined time derivative of the reception signal, a straight line, the straight line representing a measure for a time derivative of a phase response of an interference signal; and the elimination device is configured to eliminate the interference signal from the reception signal.

10. The device of claim 9, wherein:

the radar system includes an IQ mixer, the IQ mixer configured to provide an I-portion of the reception signal along an I path of the IQ mixer and to provide a Q-portion of the reception signal along a Q path of the IQ mixer, separate from the I path;

the straight line is ascertained by the ascertainment device based on a time derivative of only one of: (i) a time derivative of the provided I-portion of the reception signal, or (ii) a time derivative of the provided Q-portion of the reception signal;

the time derivative of the provided I-portion of the reception signal and the time derivative of the provided Q-portion of the reception signal are respectively weighted with the straight line; and an I-component and a Q-component of a useful signal of the reception signal are reconstructed using the weighted time derivative of the I-portion of the reception signal and the weighted time derivative of the Q-portion of the reception signal.

11. The device as recited in claim 9, wherein the time derivative of the reception signal is a rate of change of the reception signal over time.

12. The device as recited in claim 11, wherein the extreme values of the determined time derivative of the reception signal are peak values of the determined time derivative of the reception signal.

13. A non-transitory computer-readable medium on which are stored instructions that are executable by a processor and that, when executed by the processor, cause the processor to perform a method for operating a radar system of a motor vehicle, the method comprising:

receiving, by a differentiator, a reception signal from a receiver of the radar system;

determining, by the differentiator, a time derivative of the reception signal;

ascertaining, by an ascertainer from extreme values of the determined time derivative of the reception signal, a straight line, the straight line representing a measure for a time derivative of a phase response of an interference signal; and eliminating, by an eliminator, the interference signal from the reception signal based on the straight line.

* * * * *